(No Model.)

H. A. MOYER.
TWO WHEELED VEHICLE.

No. 378,057. Patented Feb. 14, 1888.

WITNESSES:
H. P. Denison
C. L. Burdison

INVENTOR
Harvey A. Moyer
BY
Duell, Laass & Duell
ATTORNEYS

UNITED STATES PATENT OFFICE.

HARVEY A. MOYER, OF SYRACUSE, NEW YORK.

TWO-WHEELED VEHICLE.

SPECIFICATION forming part of Letters Patent No. 378,057, dated February 14, 1888.

Application filed September 7, 1887. Serial No. 249,014. (No model.)

*To all whom it may concern:*

Be it known that I, HARVEY A. MOYER, of Syracuse, in the county of Onondaga, in the State of New York, have invented new and useful Improvements in Two-Wheeled Vehicles, of which the following, taken in connection with the accompanying drawings, is a full, clear, and exact description.

This invention relates to the class of two-wheeled vehicles usually termed "road-carts," and has special reference to those carts which have the body hung on the thills.

The invention consists in improved means for elastically supporting the vehicle-body without subjecting the same to vibration incident to the motion of the horse, all as hereinafter fully described, and specifically set forth in the claims.

Figure 1:
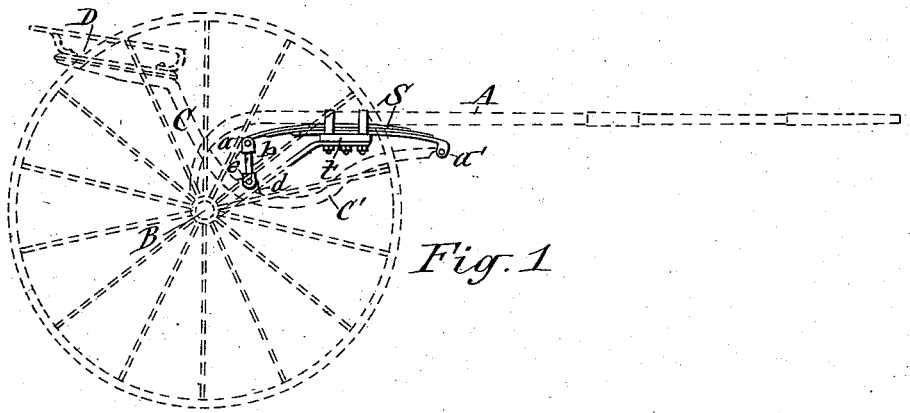
Figure 2:
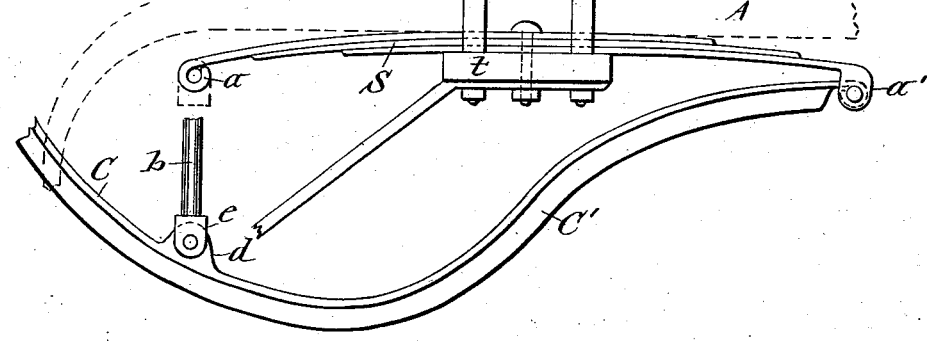

In the accompanying drawings, Figure 1 is a side elevation of a vehicle embodying my improvements, shown partly in full lines and partly in dotted lines; and Fig. 2 is an enlarged detail side view of the improved spring-support of the body.

A represents the thill, connected to the axle B in any suitable and well-known manner.

C denotes the body or seat-supporting bars, consisting, chiefly, of two side bars which are curved downward from the seat D and formed with the usual forward extension, C', which carries the foot-rest.

S represents one of the springs by which the body is supported. It is composed of leaves lying one upon the other, and having the top leaf extending rearward from the end of the subjacent leaf and the bottom leaf extending forward from the end of the superposed leaf, said spring being secured transversely to the cross-bar $t$ of the thills by a bolt or bolts passing through the same, or by other suitable and well-known means. The rear end of the spring is provided with a shackle-eye, $a$, and the forward end is formed with downward-projecting perforated ears $a'$. To these ears I couple the forward extremity of the body by providing the same with a perforated eye, which enters between the ears $a'$, and is connected thereto by a bolt passing through said ears and intervening eye. To the eye $a$, on the rear end of the spring, I connect a pendent stirrup, $b$, which is provided at opposite ends with perforated ears $e\ e$. The ears of the upper end of the stirrup receive between them the eye $a$ of the spring, and is connected thereto by a bolt passing through said parts. The ears $e$ on the lower end of the stirrup straddle an eye, $d$, formed on the central portion of the side rail of the body, and is coupled thereto by a bolt passing through the aforesaid ears and eye $d$, or by any other suitable coupling.

It will be observed that by the employment of the described leaf-springs and the connection therewith of the forward extremity and central portion of the body the latter is allowed to vibrate vertically at both ends, and the entire support of the body is elastic. The forward spring-support destroys the horse motion of the vehicle-body, while the other spring-support carries the load.

Having described my invention, what I claim as new, and desire to secure by Letters Patent, is—

1. In a two-wheeled vehicle, the combination of the bars C C, curved downward from the seat and formed with the forward extension, C', the leaf-springs S S, secured transversely to the cross-bar $t$ and connected at the forward ends to the ends of the bar-extensions C' C', and the stirrups $b\ b$, suspended from the rear ends of the aforesaid springs and connected to the central portion of the bars C C, substantially as described and shown.

2. In combination with the cross-bar of the thills and the bars C C, the springs S, secured at their central portion to the cross-bar of the thills crosswise thereof and composed of leaves lying one upon the other, and having the top leaf extending rearward from the end of the subjacent leaf, the bottom leaf extending forward from the end of the superposed leaf and connected to the forward ends of the bar-extension C', and stirrups $b\ b$, suspended from the rear ends of the springs and connected to the central portion of the bars C, substantially as described and shown.

In testimony whereof I have hereunto signed my name, in the presence of two witnesses, at Syracuse, in the county of Onondaga, in the State of New York, this 3d day of September, 1887.

HARVEY A. MOYER. [L. S.]

Witnesses:
C. H. DUELL,
N. M. SEAMANS.